United States Patent
Borsen

(10) Patent No.: US 8,256,376 B2
(45) Date of Patent: Sep. 4, 2012

(54) METHOD OF AND IMPLEMENT FOR MILKING DAIRY ANIMALS

(75) Inventor: Paul Clemens Borsen, Blaricum (NL)

(73) Assignee: Maasland N.V., Maassluis (NL)

( * ) Notice: Subject to any disclaimer, the term of this patent is extended or adjusted under 35 U.S.C. 154(b) by 140 days.

(21) Appl. No.: 12/105,345

(22) Filed: Apr. 18, 2008

(65) Prior Publication Data

US 2008/0257265 A1 Oct. 23, 2008

(30) Foreign Application Priority Data

Apr. 18, 2007 (NL) .................................... 1033712

(51) Int. Cl.
*A01J 5/00* (2006.01)

(52) U.S. Cl. .................. 119/14.02; 119/14.03

(58) Field of Classification Search ............... 119/14.02, 119/14.03, 14.05, 14.08
See application file for complete search history.

(56) References Cited

U.S. PATENT DOCUMENTS

| | | | | |
|---|---|---|---|---|
| 1,220,636 A | * | 3/1917 | James | 49/190 |
| 3,603,292 A | * | 9/1971 | Finch | 119/14.1 |
| 4,000,718 A | * | 1/1977 | Brown | 119/14.03 |
| 4,136,641 A | * | 1/1979 | Hoffman | 119/840 |
| 5,054,425 A | * | 10/1991 | Grimm et al. | 119/14.02 |
| 5,140,942 A | * | 8/1992 | Flocchini | 119/14.02 |
| 5,241,924 A | * | 9/1993 | Lundin et al. | 119/51.02 |
| 5,771,837 A | * | 6/1998 | Van der Lely | 119/14.02 |
| 5,782,199 A | * | 7/1998 | Oosterling | 119/14.02 |
| 5,970,920 A | * | 10/1999 | Peacock | 119/738 |
| 6,062,164 A | * | 5/2000 | Oosterling | 119/14.02 |
| 6,095,086 A | * | 8/2000 | Aurik et al. | 119/14.02 |
| 6,394,028 B1 | * | 5/2002 | Birk | 119/14.08 |
| 6,516,744 B1 | * | 2/2003 | Bjork et al. | 119/14.02 |
| 6,571,730 B1 | * | 6/2003 | Norberg | 119/14.03 |
| 6,622,651 B1 | * | 9/2003 | Dessing | 119/14.08 |
| 6,705,247 B1 | * | 3/2004 | Heslin et al. | 119/14.02 |
| 7,073,458 B2 | * | 7/2006 | Sjolund et al. | 119/14.02 |
| 7,114,458 B2 | * | 10/2006 | Sundborger | 119/14.02 |
| 7,131,393 B2 | * | 11/2006 | Woolford et al. | 119/14.03 |
| 7,500,452 B2 | * | 3/2009 | O'Connell | 119/840 |
| 8,127,714 B2 | * | 3/2012 | Sundborger et al. | 119/14.02 |
| 2003/0154925 A1 | * | 8/2003 | Van Den Berg et al. | 119/14.02 |

(Continued)

FOREIGN PATENT DOCUMENTS

| WO | WO0117339 A1 | 3/2001 |
|---|---|---|
| WO | WO03086058 A1 | 10/2003 |
| WO | WO2006098678 A1 | 9/2006 |

*Primary Examiner* — Rob Swiatek
*Assistant Examiner* — Ebony Evans
(74) *Attorney, Agent, or Firm* — Coraline J. Haitjema; David P. Owen; Hoyng Monegier LLP

(57) ABSTRACT

A method of milking dairy animals, wherein the dairy animals are milked by a milking implement. An access device is provided for allowing or not allowing a dairy animal access to a waiting area for the milking implement. The access device has at least a first and a second access state, which access states have mutually different accesses for the dairy animals to the waiting area. The method comprises the steps of providing the first access state of the access device; identifying by means of an animal identification system an animal which is milked by the milking implement; determining a milking implement processing data on the basis of the identified animals; comparing the milking implement processing data with a criterion; and providing the second access state of the access device when the milking implement processing data meets the criterion.

14 Claims, 3 Drawing Sheets

U.S. PATENT DOCUMENTS

2004/0261723 A1* 12/2004 Birk .......................... 119/14.02
2006/0266293 A1* 11/2006 Fink et al. ................. 119/14.02
2008/0184936 A1* 8/2008 Petterson et al. .......... 119/14.02
2008/0282985 A1* 11/2008 Schulte ..................... 119/14.02

* cited by examiner

METHOD OF AND IMPLEMENT FOR MILKING DAIRY ANIMALS

CROSS REFERENCE TO RELATED APPLICATIONS

This application claims priority from Dutch application number 1033712 filed on 18 Apr. 2007, the contents of which are hereby incorporated by reference in their entirety.

BACKGROUND OF THE INVENTION

1. Field of the Invention

The invention relates generally to methods and implements for milking dairy animals.

2. Description of the Related Art

It is known to have dairy animals milked by a milking robot. It is, for example, possible in this case to make use of voluntary access to the milking robot, whereby a dairy animal, such as a cow, goat, sheep, etc., may walk to the robot of its own accord and be milked by the robot. It is also known to provide an access device wherein an animal is only allowed access to the milking robot again after a particular period of time has elapsed since a previous milking of the same animal.

In practice it is found that it sometimes occurs that animals in such a voluntary milking environment wait too long before walking of their own accord to the milking machine, milking robot or other milking implement. In that case, a user can select the relevant animals and drive these to the milking implement. All in all, however, this is a very time consuming process, because in this case the user has to see to it that the relevant animals are indeed milked by the milking implement and do not, for example, still walk away from the milking implement of their own accord. The invention aims at providing a method and implement that may alleviate such difficulties in a manner which is time efficient for the user.

BRIEF SUMMARY OF THE INVENTION

The present invention addresses these problems by providing a method of milking dairy animals wherein the dairy animals are milked by a milking implement and an access device is provided for allowing or not allowing a dairy animal access to a waiting area for the milking implement, wherein the access device has at least a first and a second access state, which access states have mutually different conditions of access for the dairy animals to the waiting area, and wherein the method comprises the steps of: a) providing the access device in the first access state; b) identifying by means of an animal identification system an animal which is milked by the milking implement; c) determining milking implement processing data on the basis of the identified animal; d) comparing the milking implement processing data with a criterion; and e) providing the access device in the second access state when the milking implement processing data meets the criterion.

By providing an access device which offers access to a waiting area and by controlling the access device by the control device, it is possible to control access to the milking implement. The user may, for example, drive the relevant dairy animals which should be milked into the waiting area, after which the control device sets the access device in the first access state (for example a closed state). In each case when one of the animals is milked in the waiting area, it can be identified by the animal identification system. On the basis of the identified animals, it is subsequently possible to determine a milking implement processing data which is compared with a criterion, for example that one or more specific animals which have been driven into the waiting area by the user have been milked, that all animals present in the waiting area have been milked, etc. When the criterion has been met, the control device may control the access device to provide the second access state, for example an open access state, so that, after the animals driven into the waiting area by the user have been milked, free access to the milking implement will be offered again. The milking implement processing data may comprise any suitable data relating to the milking of animals by the milking implement.

In one embodiment, as already indicated in the foregoing, the first access state is a closed state and the second access state is an open state. It is thus possible to milk a number of e.g. selected animals and subsequently to have the control device switched to a free passage for the dairy animals to the milking implement. It is also possible that the second access state offers an access condition in which the access device is passable in a direction into the waiting area and which is closed in a direction out of the waiting area, or that the second access state is an access state which is opened at least in a direction into the waiting area, so that e.g. leaving the waiting area via the access device can be prevented. It is thus possible to achieve that animals, once having entered the waiting area, will not be able still to go back of their own accord, but will only be able to leave the waiting area via the milking implement. In this manner, animal circulation can be promoted.

In one embodiment, the criterion comprises that one or more dairy animals which were present in the waiting area in the closed access state of the access device have been milked. In this embodiment, many advantages may be achieved. It is, for example, possible that the animals which should be milked are driven into the waiting area. This relates in particular to animals which should be milked with priority, because they have been eligible to be milked for a relatively long time already. For this and other reasons, such animals may be driven into the waiting area. The access device may subsequently be kept in the closed state until the criterion has been met, for example, that all animals present in the waiting area or all animals driven into the waiting area have been milked. It is thus possible to prevent that other animals will be given priority or that one or more of the animals driven into the waiting area will still walk out of the waiting area without having been milked. Additionally, the advantage may be achieved that the user himself need not wait until, in this example, all animals which were present in the waiting area have been milked, because when the criterion is reached the access device can be brought automatically into the second access state (for example an opened state).

The milking implement may comprise any suitable milking implement, and preferably a milking robot, an automated milking robot, etc. The access device may comprise any suitable access device, for example a gate, sluice, door, etc., which is capable of e.g. pivoting or swinging to provide access. In addition to or instead of the examples of access states given in the foregoing, there may also be provided an access state (for example the first or the second access state or another access state), wherein the access device provides selectively access for an animal which meets a particular criterion, for example an animal for which a period of time since the last milking has exceeded a predetermined period of time.

If the criterion comprises that one or more specific animals have been milked, it is thus possible to ensure that those specific animals, such as e.g. the animals which are driven to the waiting area by the user, will actually be milked before the access state changes again e.g. to free animal traffic from and to the waiting area. It may, for example, occur that other animals are already present in the waiting area. By changing the access state again only after precisely the animals driven into the waiting area by the user have been milked, it may be prevented that a premature change of the access state occurs before those animals driven by the user have been milked. The user could input the identification of the relevant animals manually, for example via a terminal; however, it is also possible that there is provided a second animal identification device for identifying an animal which enters or leaves the waiting area. This second animal identification device may, for example, be included in or be placed at the access device. It is subsequently possible for the control device to determine which animals are present in the waiting area, on the basis of the animals identified by the second animal identification device and the animals detected by the first animal identification device and milked.

In one embodiment, the criterion may comprise a number of animals milked. In this case, the user may be offered the possibility of inputting the number of animals to be milked. In this case, the user may drive a number of animals to the waiting area, and the access device will only switch to the second access state when the relevant number of animals has been milked. Besides the possibility of inputting manually the number of animals to be milked by means of e.g. a terminal or other input means, it is also possible that the number of animals to be milked is a predetermined number. In other words, the criterion may be a predetermined criterion, which may be practical if it concerns in each case the same number of animals.

It is further possible that the control device determines the number of animals present in the waiting area or determines the number of animals to be milked on the basis of data from the second animal identification system and the first animal identification system, so that manual input or a deviation can thus be avoided.

In a preferred embodiment, it is possible that the milking implement comprises two or more milking robots, and that the milking implement processing data is determined on the basis of the animals milked by each of the at least two milking robots, so that animals milked by each of the milking robots are taken into consideration when determining the milking implement processing data. In this manner it is possible to serve a plurality of milking robots or different milking implements from one waiting area, so that circulation from the waiting area to a plurality of milking robots or the like is possible.

In order to obtain a simple and reliable construction, it is possible that the access device comprises a gate which is movable in vertical direction. In order to prevent the animals from pushing this gate upward or downward, for example by pushing their heads in vertical direction, this gate may be provided with a self-locking pin in order thus to prevent the gate from being displaced by a force exerted by the animals.

In another aspect of the invention, there is provided an implement for milking dairy animals comprising a milking implement for milking the dairy animals and an access device for allowing or not allowing a dairy animal access to a waiting area for the milking implement, wherein the access device has at least a first and a second access state which have a mutually different access condition of the dairy animals to the waiting area and wherein the implement comprises a control device which is arranged (e.g. programmed by means of suitable program instructions) to a) provide the first access state of the access device; b) identify by means of an animal identification system an animal which is milked by the milking implement; c) determine a milking implement processing data on the basis of the identified animals; d) compare the milking implement processing data with a criterion; and e) provide the second access state of the access device when the milking implement processing data meets the criterion.

By means of the implement according to the invention it is possible to achieve the same or similar effects as by means of the above-mentioned method. Furthermore, for the implement the same or similar preferred features are possible, by means of which the same or similar effects can be achieved as by means of the method according to the invention.

BRIEF DESCRIPTION OF THE DRAWINGS

Further advantages, characteristics and properties of the invention will now be elucidated with reference to the accompanying drawing in which a non-limiting exemplary embodiment is shown, in which.

DESCRIPTION OF ILLUSTRATIVE EMBODIMENTS

Figure 1:
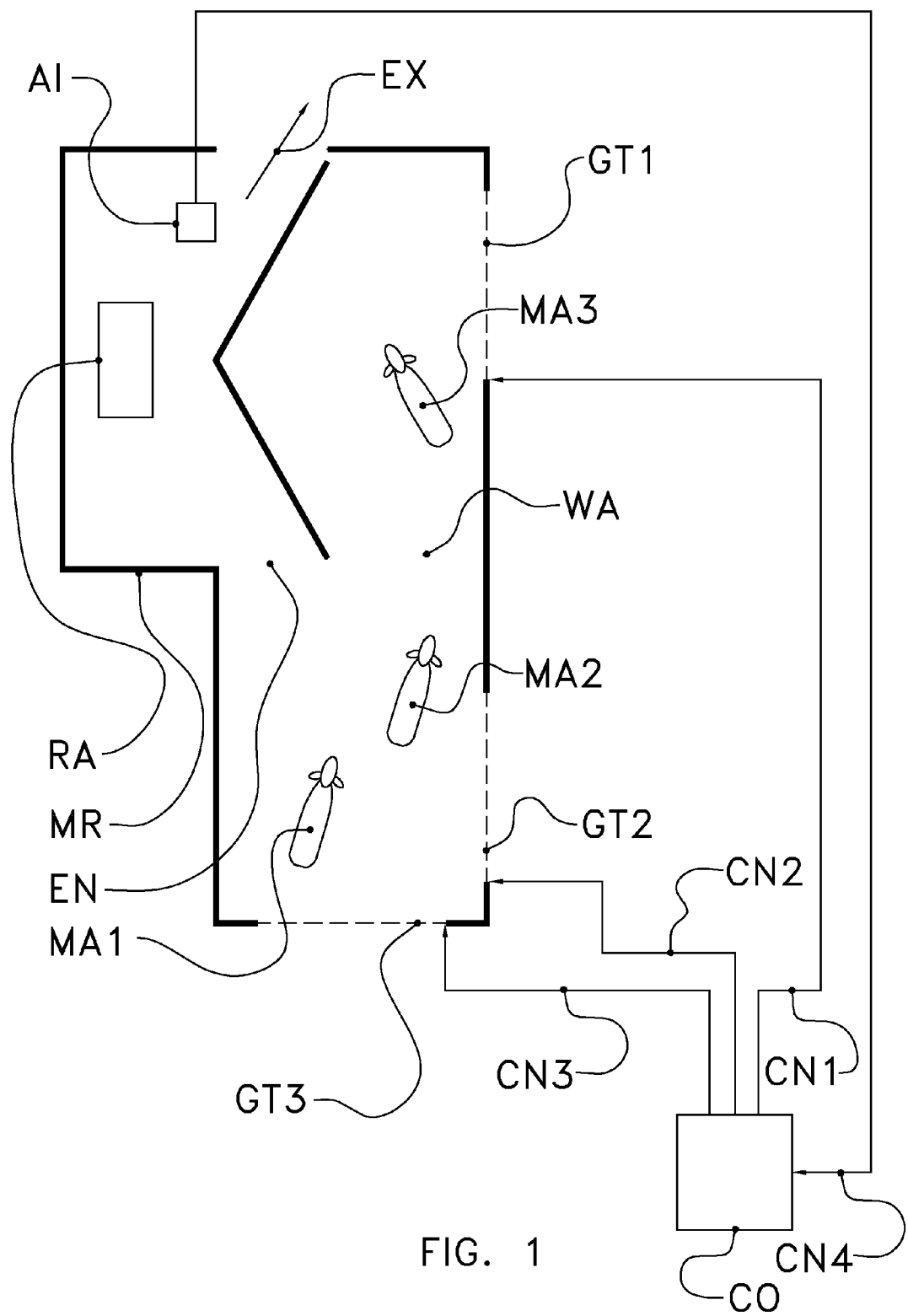
FIG. 1 is a diagrammatic plan view of a milking implement and the waiting area according to an aspect of the invention.

The following is a description of certain embodiments of the invention, given by way of example only and with reference to the drawings. Referring to FIG. 1 there is shown diagrammatically a milking robot MR which is provided with a robot arm disposed thereon for milking the cow. The robot is provided with an entrance EN and an exit EX, through which the animal can enter the milking robot, and leave the milking robot, respectively. The exit EX may be provided with a gate arrangement to control movement of an animal leaving the milking robot MR. There is provided a waiting area WA from which access can be gained to the entrance EN of the milking robot MR. The entrance EN may also be provided with an access gate arrangement (not shown) or the like to allow or prevent access from the waiting area WA to the milking robot MR.

In this example, there are provided three access devices, namely GT1, GT2, GT3, so that access to the waiting area WA can be provided. In the waiting area WA three dairy animals, namely dairy animals MA1, MA2 and MA3, are indicated diagrammatically. In this example, it is assumed that the dairy animals MA2 and MA3 have been driven into the waiting area by a user, while dairy animal MA1 had already entered the waiting area of its own accord. The user now wants the animals MA2 and MA3 to be milked, and therefore wants to release the access to the waiting area and prevent the possibility of animals leaving the waiting area of their own accord, via the access devices GT1, GT2 and/or GT3, until the moment when the animals MA2 and MA3 have been milked by the milking robot MR. To achieve this, there is provided a control device CO which controls the relevant access devices GT1, GT2, GT3 by means of the shown connections CN1, CN2, and CN3 (for example, data communication connections, control lines, or the like). The control device CO may also control access from the waiting area WA to the milking robot MR through entrance EN and from exit EX as described above. Various control criteria may also be used for this access to the milking robot MR.

When an animal MA1, MA2, MA3 is milked by the milking robot MR, this animal will be identified by an animal identification system AI. It is subsequently possible for the control device to determine a data on the basis of the identified animals and to compare this with a criterion, in this case, for example, whether both MA2 and MA3 have been milked. It is subsequently possible for the control device to control the access device GT1, GT2 and/or GT3 to provide another access state, wherein, for example, free access for animals from and to the waiting area is made possible again. The animal identification system AI is connected to the control device CO via a suitable connection, for example a data communication line or the like, in the figure symbolically denoted by CN4.

Figure 2:
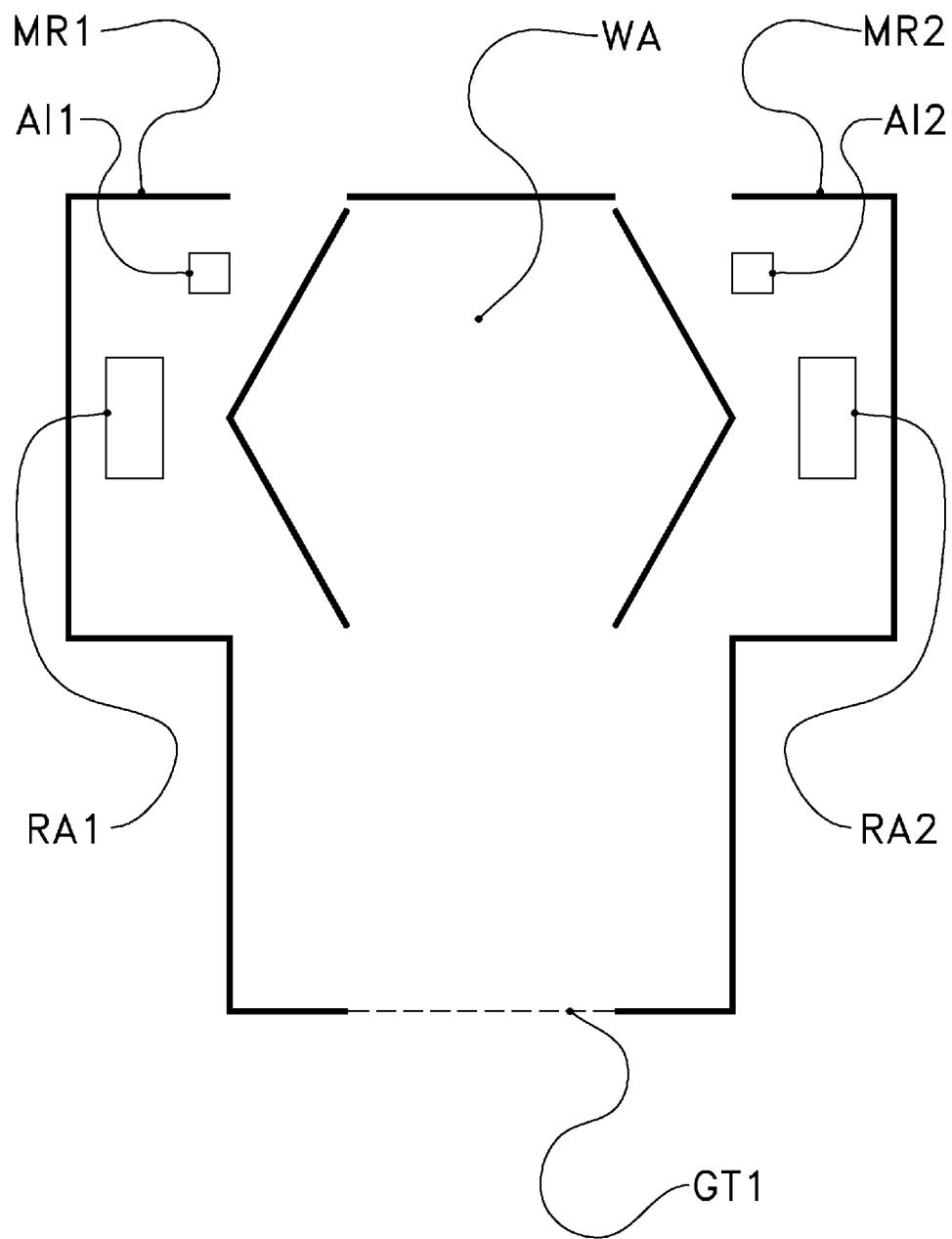
FIG. 2 is a plan view of another embodiment of an implement according to the invention.

A second example is shown in FIG. 2, wherein two milking robots MR1, MR2, each provided with a robot arm RA1, RA2, can be served from one single waiting area WA by means of an access device GT1. The two milking robots MR1, MR2 may be provided with an animal identification system AI1, AI2, respectively, so that fast handling of animals by the two milking robots connected to the waiting area is enabled, and the state of the access device can be determined on the basis of the animals milked by one of the milking robots MR1, MR2 or both of them.

Figure 3:
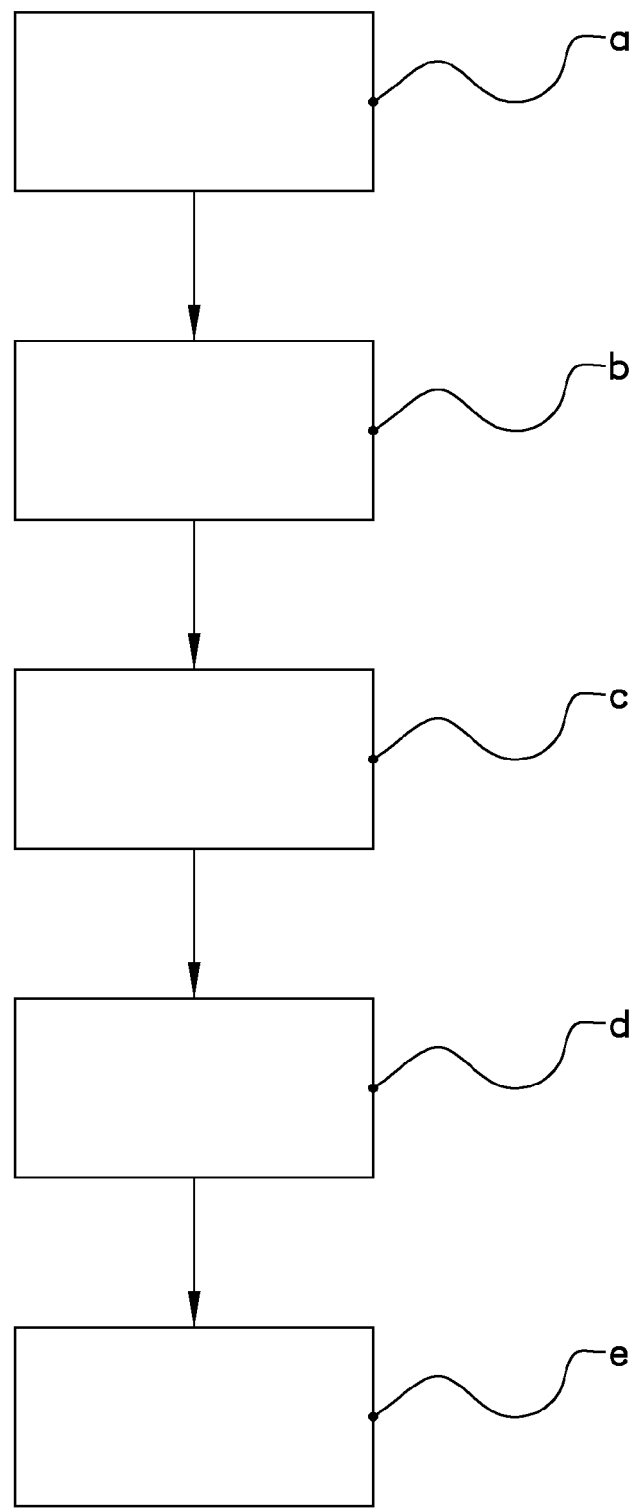
FIG. 3 shows a flowchart which illustrates a method according to the invention.

FIG. 3 shows a flowchart to illustrate a method according to an aspect of the invention, wherein in step A, the access device is controlled to provide the first access state of the access device. In step B, an animal is identified by means of the animal identification system, which animal is milked by the milking implement. In step C, milking implement processing data is determined by the control device on the basis of the identified animals. In step D, the milking implement processing data is compared with a criterion, and when the criterion is reached, the access device can, in step E, be controlled by the control device in such a manner that the second access state is provided, which second access state is different from the first access state.

Thus, the invention has been described by reference to certain embodiments discussed above. It will be recognized that these embodiments are susceptible to various modifications and alternative forms well known to those of skill in the art without departing from the spirit and scope of the invention. Accordingly, although specific embodiments have been described, these are examples only and are not limiting upon the scope of the invention.

What is claimed is:

1. A method of milking dairy animals using a milking implement and an access device for allowing or not allowing one or more dairy animals access to a waiting area for the milking implement, the milking implement being separated from the waiting area and accessible from the waiting area via an entrance, wherein the access device has at least first and second mutually different access states, and wherein the method comprises the steps of:
   a) driving a plurality of dairy animals into the waiting area, the plurality of animals including one or more specific animals to be milked, the plurality of animals being present in the waiting area simultaneously and having free access to the entrance for access to the milking implement;
   b) providing the access device in the first access state wherein the first access state is a closed access state, that does not allow access to the waiting area;
   c) identifying by means of an animal identification system the animals from the plurality of animals which are being milked by the milking implement after said device is in said closed access state;
   d) determining milking implement processing data on the basis of the identified animals;
   e) comparing the milking implement processing data that includes which animals have been milked according to (c) with a criterion, wherein the criterion is that said one or more specific animals which were present in the waiting area in the closed access state of the access device have been milked; and
   f) providing the access device in the second access state when the milking implement processing data meets the criterion; wherein the second access state is an access state which is open at least in a direction into the waiting area.

2. Method according to claim 1, wherein in the second access state the access device is passable in a direction into the waiting area and is closed in a direction out of the waiting area.

3. Method according to claim 1, wherein the criterion comprises the requirement that all animals present in the waiting area have been milked.

4. Method according to claim 1, wherein the criterion comprises a number of animals to have been milked.

5. Method according to claim 4, wherein a user is offered the possibility of inputting a number of animals required to be milked.

6. Method according to claim 4, wherein the number of animals milked is a predetermined number.

7. Method according to claim 1, wherein step c takes place at the milking implement.

8. Method according to claim 1, wherein the milking implement comprises a milking robot.

9. Method according to claim 1, wherein the milking implement comprises at least two milking robots and wherein the milking implement processing data is determined on the basis of the animals milked by each of the at least two milking robots.

10. Method according to claim 1, wherein the access device comprises a gate which is movable in vertical direction, which gate is provided with a self-locking pin in order to prevent the gate from being displaced in vertical direction by a force exerted by the animals.

11. An implement for milking dairy animals, comprising:
   a milking implement for milking the dairy animals,
   a waiting area for accommodating a plurality of dairy animals at the same time, the milking implement being separated from the waiting area and accessible from the waiting area via an entrance, the waiting area allowing free access by the plurality of animals to the entrance for access to the milking implement; and
   an access device for allowing or not allowing a dairy animal access to the waiting area for the milking implement, wherein the access device has at least a first and a second access state, which access states have mutually different conditions of access for the dairy animals to the waiting area, and wherein the implement comprises a control device which is arranged to:
   a) provide the first access state of the access device is a closed state, thereby not allowing access to the waiting area after a plurality of dairy animals including one or more specific animals to be milked have been driven into the waiting area;
   b) identify by means of an animal identification system an animal which is being milked by the milking implement;
   c) determine milking implement processing data on the basis of the identified animal in (b);
   d) compare the milking implement processing data that includes which animals have been milked according to (c) with a criterion wherein the criterion is that said one or more specific animals which were present in the waiting area in the closed access state of the access device have been milked; and e) provide the second access state of the access device when the milking implement processing data meets the criterion, wherein the second access state is an access state which is open at least in a direction into the waiting area.

12. The implement according to claim 11, wherein the milking implement comprises a milking robot.

13. The implement according to claim 11, wherein the milking implement comprises at least two milking robots and wherein the control device is arranged to determine the milking implement processing data on the basis of the animals milked by each of the at least two milking robots.

14. The implement according to claim 11, wherein the access device comprises a gate which is movable in vertical direction, which gate is provided with a self-locking pin in order to prevent the gate from being displaced in vertical direction by a force exerted by the animals.

* * * * *